United States Patent [19]

Miller

[11] 3,870,130
[45] Mar. 11, 1975

[54] SHOCK ABSORBER
[75] Inventor: Gerald R. Miller, Hillsburgh, Ontario, Canada
[73] Assignee: Gabriel of Canada Limited, Hillsburgh, Ontario, Canada
[22] Filed: Apr. 9, 1973
[21] Appl. No.: 349,565

[30] Foreign Application Priority Data
May 15, 1972 Canada .............................. 142077

[52] U.S. Cl.................. 188/288, 188/268, 188/314, 267/120, 267/136, 293/1
[51] Int. Cl............................................. F16f 9/48
[58] Field of Search .......... 188/286, 288, 268, 314, 188/316; 267/118, 120, 121, 136, 139; 293/1, 60, 70, 85

[56] References Cited
UNITED STATES PATENTS
1,216,221  2/1917  Erickson et al...................... 188/288
1,461,091  7/1923  Hewley .............................. 188/268
2,963,175  12/1960  Thornhill ............................. 188/28
2,965,074  12/1960  Williamson ......................... 188/314
3,489,087  1/1970  Soderberg........................... 188/268
3,700,273  10/1972  Jackson et al. ................. 267/139 X
3,715,114  2/1973  Thorskey et al.................. 293/70 X FOREIGN PATENTS OR APPLICATIONS
821,516  12/1937  France................................ 188/288
1,413,974  9/1965  France................................ 188/314
1,809,697  10/1970  Germany ........................... 188/288

Primary Examiner—Trygve M. Blix
Assistant Examiner—Edward R. Kazenske
Attorney, Agent, or Firm—Finnegan, Henderson, Farabow and Garrett

[57] ABSTRACT
Disclosed is an impact absorber which employs a variable orifice together with a media having essentially hysteresis curve property i.e., a thixotropic media — in order to provide a shock absorber with an essentially linear retarding force to impact.

1 Claim, 3 Drawing Figures

PATENTED MAR 11 1975　　　3,870,130
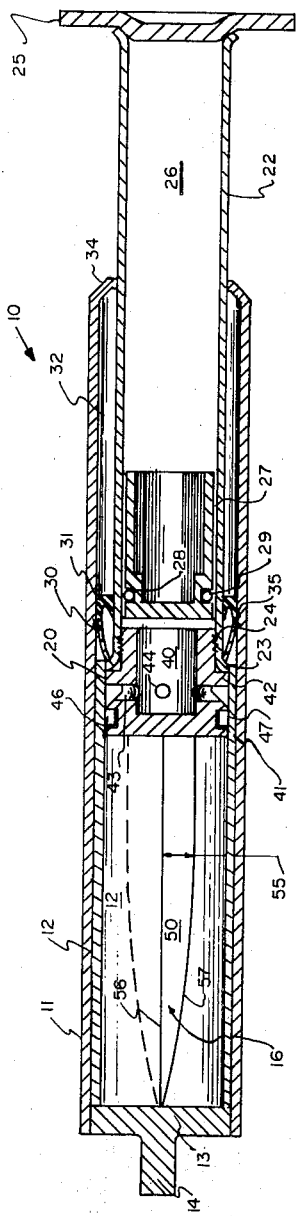
FIG 1
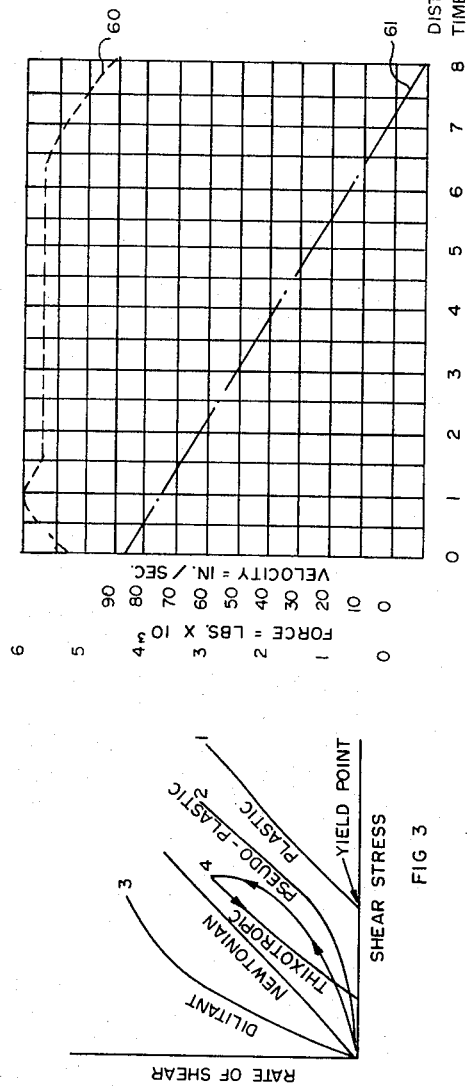
FIG 2
FIG 3

SHOCK ABSORBER

This invention relates to a shock absorber and more particularly to an impact absorber.

Shock absorbers are of two basic types — constant orifice and variable orifice.

The constant orifice type uses one or more metering holes that can cause wide internal pressure variations because of their critical size. In some cases, this type of shock absorber produces considerable shock waves at the end of the stroke.

The variable orifice type, on the other hand, produces a moderately constant cylinder pressure and a resisting force that results in a lower system stress. In addition this type is much easier to seal.

Functionally these two types of shock absorbers can be re-classified as; a variable pressure, constant orifice type; and, a constant pressure variable orifice type.

In relation to the variable orifice type, the orifice metering configurations range from a fixed orifice area throughout the stroke to an area which varies exponential with the stroke.

It is known that the variable orifice shock absorber is most efficient and economical device for stopping moving objects, particularly when the operating media is a liquid, or gas or a variation of the two.

It is therefore an object of the present invention to achieve a shock absorber whose primary application is for use in association with automobile bumpers. The invention therefore contemplates as an object an impact absorber which displays throughout a significant portion of its absorption stroke an essentially constant force against the impact force with an inhibiting velocity which is essentially non-linear.

The present invention further contemplates the use of a thixotropic grease or fluid to provide a low coefficient of restitution with the appended result that the change of a "whip-lash" injury in an automobile accident is reduced.

Further, it is an object to provide means wherein seal leakage does not immediately affect performance. The invention therefore achieves an impact device comprising:
a. containing means;
b. a hysteresis fluid in said containing means;
c. means movable in said containing means for transmitting a shock force to said fluid;
d. a variable orifice in one of said containing means and said movable means, said hysteresis fluid being forced through said orifice upon movement of said movable means thereby providing an essentially constant restraining force to the movement until the movement is inhibited.

More particularly the invention achieves an impact absorber comprising:
a. a pressure cylinder;
b. an orificed metering sleeve disposed within the pressure cylinder;
c. an accumulator cylinder having a closure at one end;
d. a movable damping piston affixed to the other end of the accumulator cylinder, the piston, disposed within the sleeve of the pressure cylinder and adapted for reciprocation therein, the piston including orifice means communicating the interior of the accumulator cylinder with the interior of the sleeve through the orifice of the sleeve, irrespective of the position of the piston within the sleeve.
e. a floating piston located within the accumulator cylinder;
f. a thixotropic fluid disposed in the sleeve whereby impact on the accumulator cylinder causes the thixotropic fluid to flow through the orifice of the absorber to present an essentially constant retarding force against the impact.

The present invention will now be described by way of example with reference to the accompanying drawings in which:

FIG. 1 is a longitudinal section of a preferred form of the present invention, showing a self-restoring shock absorber utilizing a thixotropic fluid in its normal position ready for impact.

FIG. 2 is a performance diagram illustration force v. distance as well as force v. velocity.

FIG. 3 are curves of shear characteristics of various types of materials.

Referring to FIG. 1, an impact absorber 10 includes a pressure cylinder 11, which serves as a support and closure for a variable orifice metering sleeve 12 disposed within the pressure cylinder 11. The pressure cylinder 11 has an end cap 13 with means 14 thereon to affix the absorber to the frame of an automobile and the like (not shown). Within the cylinder 11 is a thixotropic fluid 16.

Telescoped inside of the pressure cylinder 11 is a damping piston 20, reciprocapably movable within the sleeve 12 and affixed to one end of an accumulator cylinder 22 which has been flared as at 23 and provided with threading 24 to engage like threads of the piston 20. The other end of the accumulator cylinder 22 carries an accumulator plate 25 which may be affixed to the bumper of an automobile (not shown) and the cylinder 22 thus defines a chamber 26; located within the accumulator chamber 26 is a floating piston 27 with a circumscribing channel 28 within which an O ring 29 is sealingly disposed between the floating piston 27 and the accumulator cylinder 22.

A retaining ring 30 with seal 31 and a bushing 32 is provided to hold the accumlator cylinder in telescoping relationship with the pressure cylinder 11. The bushing is constrained by a radial inward flare 34 of the end of the pressure cylinder 11, further, the ring 30 which is constrained by a spot weld 35 acts as a piston stop for piston 20 when in its extended position.

The damping piston 20 is provided as a hollow interior or plenum 40 and two radially outward collars 41 and 42 disposing therebetween a circumferential channel 43. The channel 43 communicates through an orifice 44 into the plenum 40 and hence to the force of the floating piston 27. Within one of the radial collars 41 a ring seat 46 is provided and a circumscribing piston ring 47 is carried therein. The piston ring 47 is adapted to frictionally engage the interior of the sleeve 12. Within the metering sleeve 12 a thixotropic fluid 50 is placed and it operates and flows, as will hereinafter be described about or through circumferential channel 43, orifice 44 and the plenum 40; within the accumulator cylinder 22 a gas is precharged at the above atmospheric pressure.

The affixed metering sleeve 12 preferably is variable orificed and the variable orifice 55 may have one side straight 56 while the other follows the exponential curve 57. In any event it is preferred that the area of the orifice vary exponentially with its larger exposed area disposed toward the accumulator cylinder and the smaller area exposed away therefrom.

In operation when the absorber is subject to impact the thixotropic fluid 50 is subjected to the movement of the damping piston 20 by its leftward movement. The thixotropic fluid moves about the collar 41 and piston ring 47 to accumulate in channel 43 and to migrate through orifice 44 into plenum 40. As the plenum 40 becomes larger due to the addition of fluid 50 the floating piston 27 is forced toward the accumulator plate 25 compressing the gas in the accumulator chamber 26. The pressure drop between the plenum 40 and chamber 50 is determined by the incremental size of orifice 55. The orifice varies at a predetermined rate along the length of the metering sleeve 12. This pressure drop determines the force required to collapse the absorber 10. After impact the gas charge in the accumulator chamber 26 working on the floating piston forces the (media) fluid 16 from the plenum 40 into the pressure chamber 50, causing the unit to extend into its original position.

The volume of thixotropic fluid 16 flowing will be variably governed by the variable diminishing orifice 55 through which the fluid flows. As a result in order to fully appreciate this effect on the thixotropic fluid we must first look at the properties of a thixotropic fluid. A thixotropic fluid exhibits a non-linear change in its flow velocity over a linear change of the force applied to the fluid. Reversely a thixotropic fluid subjected to a constant shear force will flow slower at initial impact than at a later period in time. Further, if the shear forces continually increase over a period of time the rate of increase is different than if the shear forces continually decrease in time. As a result the use of a thixotropic fluid offers a "broad band" of absorption characteristics over a variety of shock forces. Thixotropic fluids suitable for use in the present invention include Bentone greases available from Kendall Refining Company, Bradford, Pennsylvania; or Gulf Refining Company, Cooksville, Ontario, Canada.

The combination of a variable orifice and thixotropic fluid therefore provide an absorber with the dynamic response curve of FIG. 2.

By way of example, referring to FIG. 2 curve 60 represents impact force (dotted portions of curve being actual responses in accordance with the exampled dimensions below) plotted against telescoping distance of the absorber, the force being the ordinate, the distance being the absissa. Curve 61 represents the velocity of the damping piston plotted over the time span of response (time interval is approximately 0.080 seconds) of the absorber wherein the ordinate is the velocity and the absissa is the time. In such test the absorber had the following dimension:

the metering sleeve of an inner diameter of 1 15/16ths inch and outer diameter of 2 1/16ths inches the variable orifice 50 having a maximum slot width of 0.60 inches, the length 4 ¼ inches.

The selection of a thixotropic fluid, as a result of its viscous properties, is not seriously affected by temperature variation and in fact has no melting point. The high viscosity makes it easier to seal than a liquid. Further, should the seal 31 become defective only a small amount of thixotropic fluid 16 (grease) will leak past the seal, and the amount will be controlled by the distance between the pistons 20 and 27. When enough fluid 50 has leaked passed the seal 31 to permit the floating piston 20 to contact the damping piston 27 internal static pressure is relieved from the fluid and it will no longer flow as if it were a pure liquid, but react as if it were a viscous grease. Therefore, the absorber will display no signs of leakage as the fluid 20 will be trapped between the outside of the accumulator cylinder 22 and the bushing 32. Further, since a thixotropic fluid has a response characteristic of that of hysteresis, such as curve 4 of FIG. 3, in low shear stress the viscosity of the media has a greater affect on the total damping than would otherwise exist.

The embodiments of the invention in which an exclusive property or privilege is claimed are defined as follows:

1. An impact absorber comprising:
   a. a pressure cylinder;
   b. an orificed metering sleeve disposed within the pressure cylinder;
   c. an accumulator cylinder having a closure at one end;
   d. a movable damping piston affixed to the other end of the accumulator cylinder, the piston, disposed within the sleeve of the pressure cylinder and adapted for reciprocation therein, the piston including orifice means communicating the interior of the accumulator cylinder with the interior of the sleeve through the orifice of the sleeve, irrespective of the position of the piston within the sleeve;
   e. a floating piston located within the accumulator cylinder;
   f. a thixotropic fluid disposed in the sleeve whereby impact on the accumulator cylinder causes the thixotropic fluid to flow through the orifice of the absorber to present an essentially constant retarding force against the impact.

* * * * *